(12) United States Patent
Kanov et al.

(10) Patent No.: US 9,356,921 B2
(45) Date of Patent: May 31, 2016

(54) DIFFERENT AUTHENTICATION PROFILES

(71) Applicants: Yordan Kanov, Mezdra (BG); Yanislav Mihaylov, Sofia (BG)

(72) Inventors: Yordan Kanov, Mezdra (BG); Yanislav Mihaylov, Sofia (BG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/471,729

(22) Filed: Aug. 28, 2014

(65) Prior Publication Data
US 2016/0065550 A1   Mar. 3, 2016

(51) Int. Cl.
*H04L 9/00*     (2006.01)
*H04L 29/06*    (2006.01)
*H04L 9/08*     (2006.01)
*G06F 21/31*    (2013.01)

(52) U.S. Cl.
CPC .............. *H04L 63/08* (2013.01); *G06F 21/31* (2013.01); *H04L 9/0869* (2013.01); *H04L 63/061* (2013.01); *H04L 63/102* (2013.01)

(58) Field of Classification Search
CPC .......... H04L 63/10; H04L 63/08; H04L 67/30
See application file for complete search history.

(56) References Cited

U.S. PATENT DOCUMENTS

2015/0143125 A1 * 5/2015 Nix .................. H04W 52/0235
                                                713/171

* cited by examiner

*Primary Examiner* — Izunna Okeke
(74) *Attorney, Agent, or Firm* — Kenyon & Kenyon LLP

(57) ABSTRACT

A mobile device may include an authenticator and a processor. The authenticator may store one or more profiles associated with one or more keys to access one or more servers. The processor may embed one of the keys in data to be communicated to one of the servers to request access from the one of the servers. The authenticator may compare the one or more profiles to a set of parameters based upon at least one of a user's identification information, a selected program to request access, identification information of the one of the servers, identification information of an authentication register, to determine whether to select one of the profiles. If the authenticator selects one of the profiles, the authenticator may generate the one of the keys based on the selected one of the profiles.

28 Claims, 3 Drawing Sheets

100

200

DIFFERENT AUTHENTICATION PROFILES

FIELD

The present invention relates generally to user authentication on a mobile device to request access from various servers in a network environment.

BACKGROUND

As mobile solutions and mobile applications become increasingly complex, so do security protocols and user authentication protocols. One issue with such protocols is that, in a network environment, a user may wish to access data from across multiple different servers each with their own authentication codes/tokens/keys, and the user may wish to do so through a single mobile device. Additionally, several users each with their own authentication keys may share the same mobile device in a work environment. This adds to the complexity of various programs/applications on the mobile device that may need to request access from the various different servers.

Thus, there is a need to have devices or systems that can handle authentication with different servers efficiently without adding complexity to programs/applications on the mobile device.

DETAILED DESCRIPTION

Figure 1:
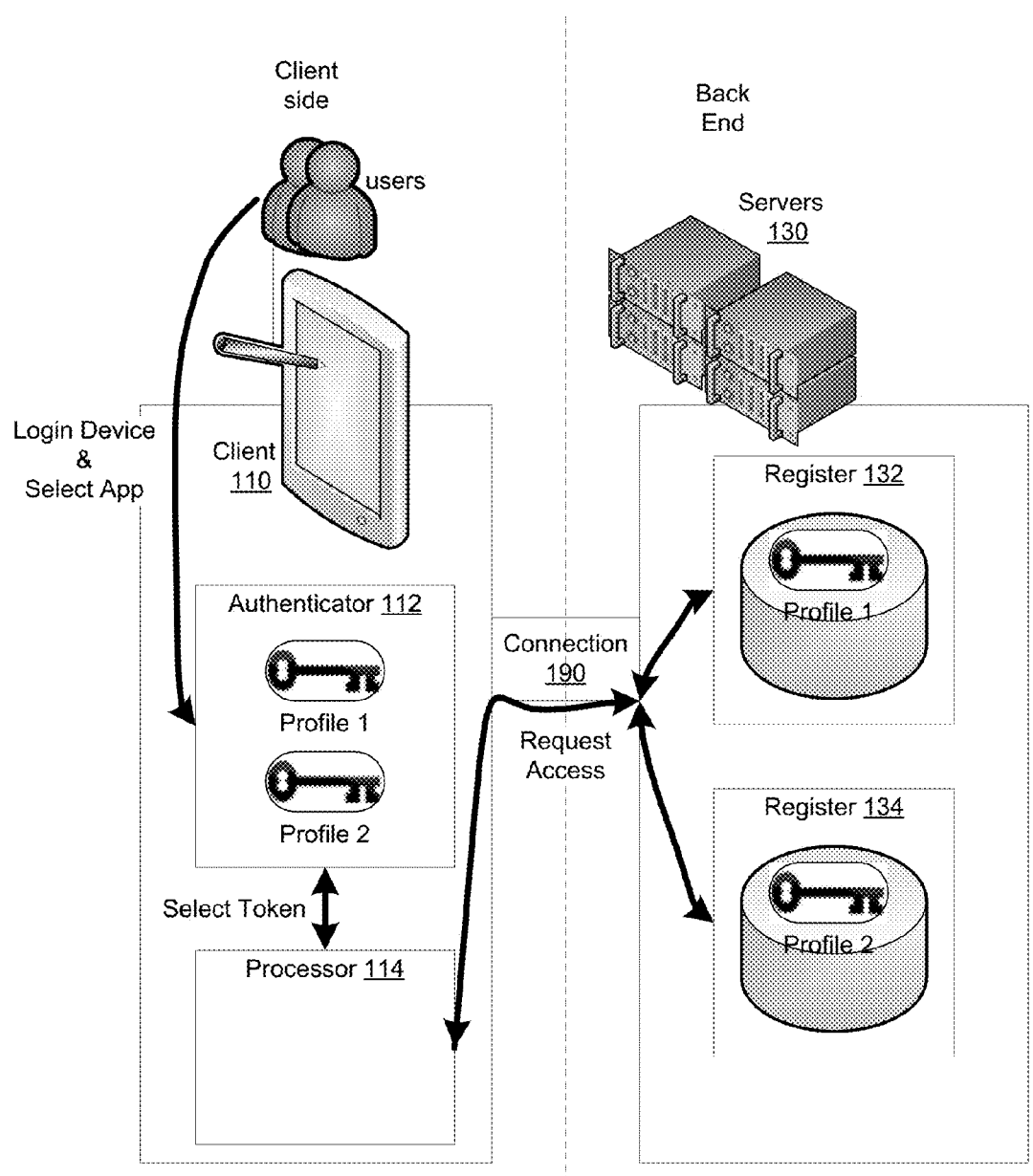
FIG. 1 illustrates an exemplary mobile device in a communication network according to an embodiment.

FIG. 1 illustrates an exemplary mobile device 110 in a communication network 100 according to an embodiment.

According to an embodiment, in a network 100, a client/mobile device 110 on the client side may include an authenticator 112, which may store a plurality of profiles each associated with a token (e.g., a segment of data or alpha-numerical sequence), and a processor 114 configured to execute one or more programs/applications (third party applications, or $3^{rd}$ party apps) that requests access from the servers 130. On the back end side, servers 130 may include a plurality of registers 132 and 134, each may include a database holding a plurality of tokens associated with a plurality of profiles. Each of the registers 132 and 134 may be specifically associated with a specific server or a specific data repository to manage authentication for access of a specific set of data. The servers 130 may be a cluster of servers in the same local network, or in different local networks. The client 110 may communicate with the servers 130 via a connection 190. The authenticator 112 may store profiles with tokens each corresponding to specific tokens and/or profiles stored in the registers 132 and 134 on the servers 130. Here, as illustrated, profile 1 on the client 110 may correspond to profile 1 in register 132, and profile 2 on the client 110 may correspond to profile 2 in register 134.

FIG. 1 illustrates an exemplary user authentication for the mobile device 110 to request access from the servers 130.

The user may register the mobile device 110 with the servers 130. The user may interact directly with the servers 130 to initiate the registration, by logging onto the servers 130 securely on a secured terminal, and then interacting with the registers 132 and 134. This may include having the servers 130 generate a secret, in the form of a segment of data or alpha-numerical sequence, and storing the secret into at least one corresponding registers 132 and 134, to be associated and stored with a user profile. This secret may be generated based on a random or pseudo-random number. The secret may be generated as uniquely associated with each specific mobile device, by for example, generating the secret using a random seed number based at least partly upon the mobile device's unique device serial number, or the device's International Mobile Station Equipment Identity (IMEI) number. The user may input the random seed number into the servers 130 and the registers 132 and 134 using manual keyboard input, or by optically scanning the barcodes of the mobile device 110 for its serial number or its IMEI number into the servers 130 and the registers 132 and 134, or by connecting the mobile device 110 directly to the servers 130 and having the servers 130 and the registers 132 and 134 scan, through a USB cable for example, the mobile device 110 for its serial number or its IMEI number.

Once the registers 132 and 134 generate the secret, one of the servers 130 may share or securely exchange the secret with the authenticator 112 on the mobile device 110. This sharing/exchanging may be done by for example, having one of the servers 130 display a QR code or a bar code that encodes the secret, and then having the mobile device 110 scan in the QR code or the bar code and storing the secret as associated with a profile for a user and the corresponding register 132 and 134 that generated the secret. Then, the mobile device 110 has a first secret that matches a second secret stored on the servers 130 in at least one of the registers 132 and 134.

Alternatively, the mobile device 110 and the servers 130 may each generate their own separate secret, and then synchronize with each other, to combine the two separate secrets, by for example, concatenation, multiplication with each other, etc. which results in a combined secret. Then, the combined secret is copied to both the mobile device 110 and the servers 130, as the shared secret.

On the mobile device 110, the authenticator 112 may register individual programs and applications that are specifically allowed to interface with the authenticator 112 to receive keys/tokens to be used for requesting access by the programs and applications from the servers 130. The authenticator 112 on the mobile device 110 may create user profiles for different individual users, and/or different profiles for specific data repositories or servers that the user registered access authentication for. In doing so, different authentication registers 132 and 134 may be handled by the authenticator 112 for different users.

During authentication, the user may initiate the authenticator 112 by logging in on the mobile device 110. The mobile device 110 and/or the authenticator 112 may request the user for initial authentication via a password or a pin as a first step. The user may select a program or application to be executed in the processor 114 on the mobile device 110, to request access to at least one of the data repositories associated with at least one of the registers 132 and 134 the servers 130.

Based upon the user's own login identification information (such as a username, or an email address, etc.) on the mobile device 110, the authenticator 112 may select the appropriate profile among a plurality of profiles for authentication and/or select the secret corresponding to the profile selected. Additionally, the selection of the profile may be made based upon other specific information in the profile, such as which data repository, which server, which register is being requested for access. This may be done, by matching the profile information to some parameters generated by the program or application executing in the processor 114. The parameters may include information generated by the user's selections in the program or application executing in the processor 114.

If none of the profiles in the mobile device 110 matches the parameters and none is selected, then the mobile device 110 may inform the user (by for example, audio or visual information) that none of the profiles match, and registration of authentication may be required.

Alternatively, if none of the profiles in the mobile device 110 matches the parameters, the authenticator 112 may select a "default" profile designated the user, and attempt to use the "default" profile and its associated secret to generate token to use to request for access. (This may occur in situations where a new data repository is requested for access. The mobile device 110 may not know what authentication is available to the new data repository, but the new data repository may be access controlled by one of the registers 132 and 134 that the mobile device 110 and the user already registered with). If the access is successful, then the "default" profile may be associated with the new set of parameters. If the access fails, then the mobile device 110 may inform the user (by for example, audio or visual information) that none of the profiles match and the "default" profile failed. The user may be prompted to select one of the other existing profiles for the user, or registration of authentication may be required. The user may also change the "default" profile as needed on the mobile device 110, to adjust for different connectivity or networking environment.

The mobile device 110 may direct the user to register with one of the registers 132 and 134. The authenticator 112 may allow the user to interact with an appropriate one of the registers 132 and 134 through the authenticator 112 in a secure communication link to perform the registration of authentication secrets and creation of profiles on the mobile device 110 and the servers 130.

If one of the profiles in the mobile device 110 matches the parameters and is selected, then the authenticator 112 may generate a key/token, such as a One-Time-Password (OTP) token, based upon the secret associated with the selected profile, and then send the key/token to the program or application executing in the processor 114. The processor 114 may embed the key/token in data communicated to the server 130 to request access from the server 130. The mobile application (for example, a web browser) may embed an URL with the OTP token to the server 130. The key/token may be regenerated as a new key/token for each new request for access, each new request for data, or each session, etc., such that the key/token is seldom or never repeated in use. The trigger of new key/token use may be based upon predetermined time period or some data even or some program event.

The key/token may be generated based partly on the secret, and partly on a temporary number that's common to the mobile device 110 and the server 130, for example, the web session ID number or a time-stamp associated with the request for access. The key/token may be generated using a predetermined algorithm using the secret, such as a symmetric key algorithm, a RSA algorithm, a AES algorithm, a DES algorithm, etc.

The server processor 136 may handle the request for access from the mobile device 110. The server processor 136 may parse the request to parse out the key/token, and pass along the key/token to a corresponding one of the registers 132 and 134 for verification. The corresponding one of the registers 132 and 134 may compare or match the key/token to the secret stored. This comparing or matching may be done by for example, having the corresponding one of the registers 132 and 134 generate its own key/token based upon the stored secret using the same predetermined algorithm as the mobile device 110, and then comparing its own key/token to the key/token parsed from the request from the mobile device 110.

If a mobile device is stolen or lost then it only has to be unregistered from the backend system. This step may be sufficient because it does not contain the actual password of the user for the backend system. Shared mobile devices can be supported by having user profiles in the authenticator app.

Figure 2:
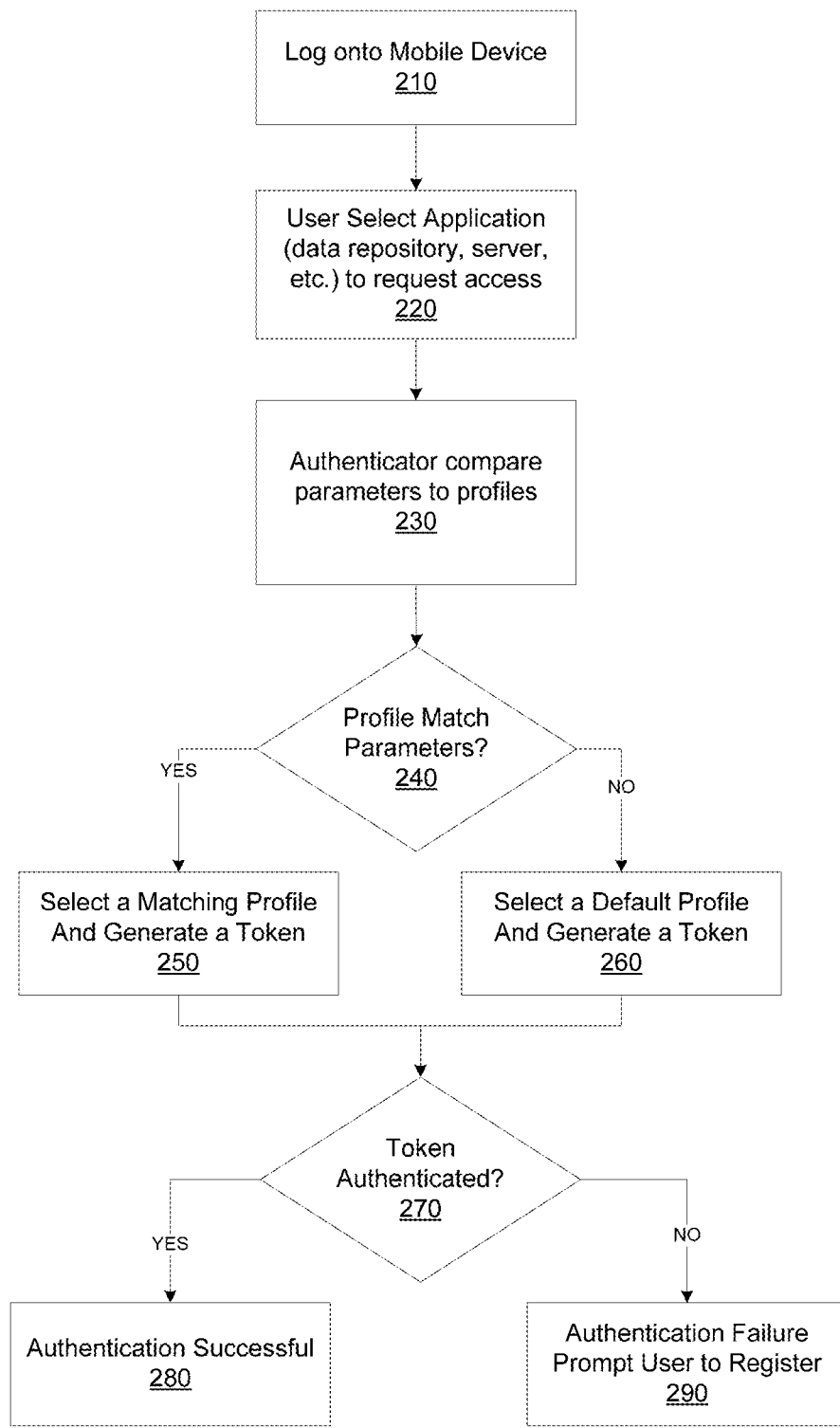
FIG. 2 illustrates an exemplary process according to an embodiment.

FIG. 2 illustrates an exemplary process 200 for authenticating the client device 110, according to an embodiment.

According to an embodiment, the process 200 may begin with the user logging onto the mobile device 110 at 210.

At 220, the user may select a $3^{rd}$ party app to be executed in the processor 114, and select other parameters such as which data repository, which server, which register to request access from. The parameters may also include the user's login identification information.

At 230, the authenticator 112 may compare or match the parameters to a plurality of profiles on the mobile device 110.

At 240, the authenticator 112 may determine if one of the profiles match the parameters.

At 250, if one of the profiles match the parameters, the authenticator 112 may select the matching profile, and generate a key/token based upon the profile and its associated secret.

At 260, if none of the profiles match the parameters, the authenticator 112 may select a "default" profile, and generate a key/token based upon the default/profile and its associated secret.

At 270, the $3^{rd}$ party app may use the token to request for access from the servers 130, and determine if the authentication is successful.

At 280, if the authentication is successful, then the mobile device 110 may continue execution of the $3^{rd}$ party app with the requested access.

At 290, if the authentication fails, then the mobile device 110 may prompt the user to register for authentication on the servers 130, (and then may retry authentication with a newly registered profile).

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

Figure 3:
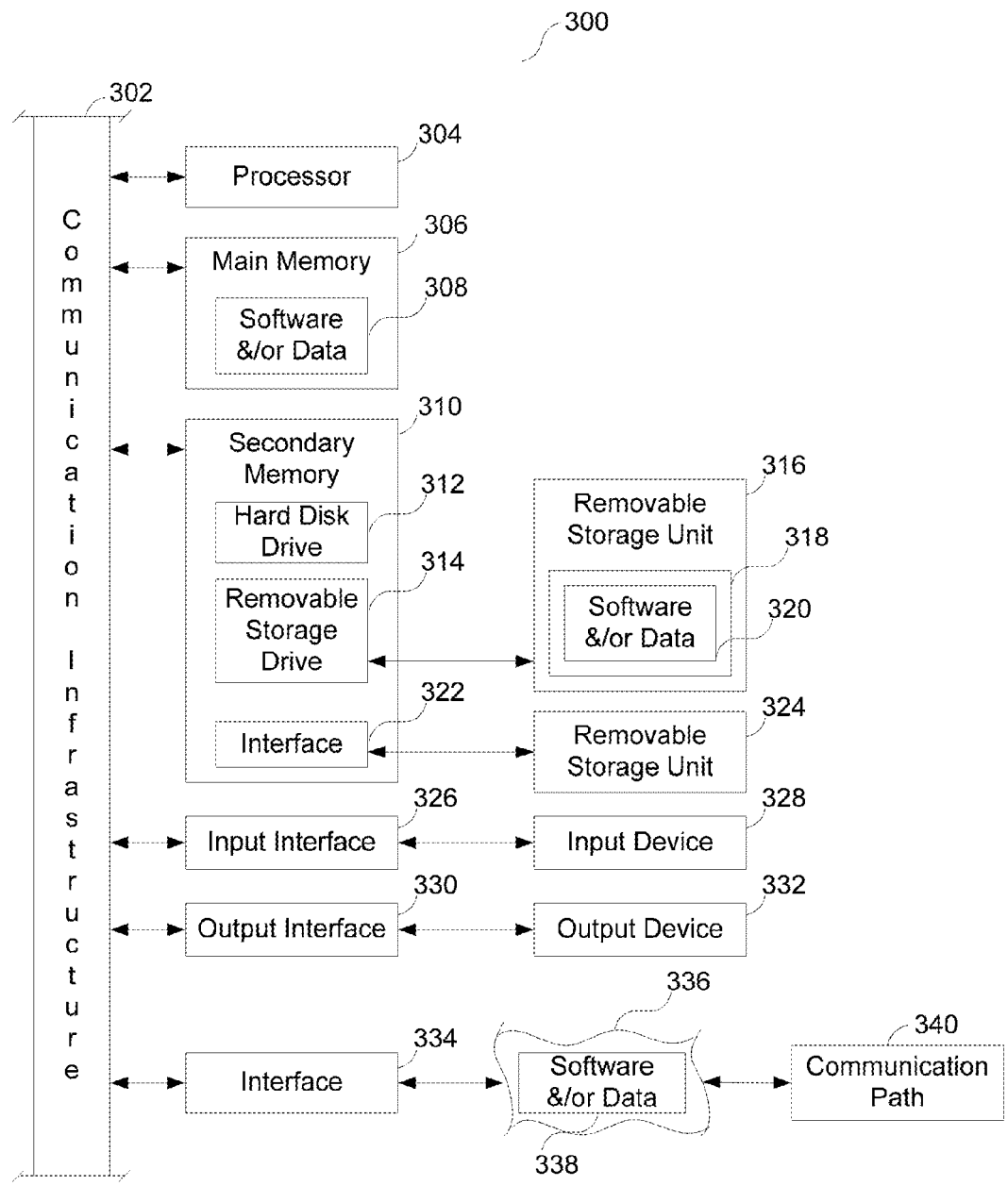
FIG. 3 illustrates an exemplary system according to an embodiment.

Aspects of the above may be implemented by software, firmware, hardware, or any combination thereof. FIG. 3 illustrates an example computer system 300 in which the above, or portions thereof, may be implemented as computer-readable code. Various embodiments of the above are described in terms of this example computer system 300. The client device 110 and the servers 130 may each be a computer system 300.

Computer system 300 includes one or more processors, such as processor 304. Processor 304 can be a special purpose processor or a general purpose processor. Processor 304 is connected to a communication infrastructure 302 (for example, a bus or a network).

Computer system 300 also includes a main memory 306, preferably Random Access Memory (RAM), containing possibly inter alia computer software and/or data 308.

Computer system 300 may also include a secondary memory 310. Secondary memory 310 may include, for example, a hard disk drive 312, a removable storage drive 314, a memory stick, etc. A removable storage drive 314 may comprise a floppy disk drive, a magnetic tape drive, an optical disk drive, a flash memory, or the like. A removable storage drive 314 reads from and/or writes to a removable storage unit 316 in a well-known manner. A removable storage unit 316 may comprise a floppy disk, magnetic tape, optical disk, etc. which is read by and written to by removable storage drive 314. As will be appreciated by persons skilled in the relevant art(s) removable storage unit 316 includes a computer usable storage medium 318 having stored therein possibly inter alia computer software and/or data 320.

In alternative implementations, secondary memory 310 may include other similar means for allowing computer programs or other instructions to be loaded into computer system 300. Such means may include, for example, a removable storage unit 324 and an interface 322. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 324 and interfaces 322 which allow software and data to be transferred from the removable storage unit 324 to computer system 300.

Computer system 300 may also include an input interface 326 and a range of input devices 328 such as, possibly inter alia, a keyboard, a mouse, etc.

Computer system 300 may also include an output interface 330 and a range of output devices 332 such as, possibly inter alia, a display, one or more speakers, etc.

Computer system 300 may also include a communications interface 334. Communications interface 334 allows software and/or data 338 to be transferred between computer system 300 and external devices. Communications interface 334 may include a modem, a network interface (such as an Ethernet card), a communications port, a Personal Computer Memory Card International Association (PCMCIA) slot and card, or the like. Software and/or data 338 transferred via communications interface 334 are in the form of signals 336 which may be electronic, electromagnetic, optical, or other signals capable of being received by communications interface 334. These signals 336 are provided to communications interface 334 via a communications path 340. Communications path 340 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 316, removable storage unit 324, and a hard disk installed in hard disk drive 312. Signals carried over communications path 340 can also embody the logic described herein. Computer program medium and computer usable medium can also refer to memories, such as main memory 306 and secondary memory 310, which can be memory semiconductors (e.g. Dynamic Random Access Memory (DRAM) elements, etc.). These computer program products are means for providing software to computer system 300.

Computer programs (also called computer control logic) are stored in main memory 306 and/or secondary memory 310. Computer programs may also be received via communications interface 334. Such computer programs, when executed, enable computer system 300 to implement the present invention as discussed herein. In particular, the computer programs, when executed, enable processor 304 to implement the processes of aspects of the above. Accordingly, such computer programs represent controllers of the computer system 300. Where the invention is implemented using software, the software may be stored in a computer program product and loaded into computer system 300 using removable storage drive 314, interface 322, hard drive 312 or communications interface 334.

The invention is also directed to computer program products comprising software stored on any computer useable medium. Such software, when executed in one or more data processing devices, causes data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), nanotechnological storage device, etc.), and communication mediums (e.g., wired and wireless communications networks, local area networks, wide area networks, intranets, etc.).

It is important to note that the particulars of FIG. 3 (such as for example the specific components that are presented, the component arrangement that is depicted, etc.) are illustrative only and it will be readily apparent to one of ordinary skill in the relevant art that numerous alternatives (including inter alia other or different components, alternative arrangements, etc.) are easily possible.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the disclosure may be implemented using Java, C++, or other object-oriented programming language and development tools. Another embodiment of the disclosure may be implemented in hard-wired circuitry in place of, or in combination with machine readable software instructions.

A data provider may be an information resource. Data provider may include sources of data that enable data storage and retrieval. Data provider may include databases, such as, relational, transactional, hierarchical, multi-dimensional (e.g., Online Analytic Processing—OLAP), object oriented databases, and the like. Further data provider may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., Enterprise resource planning system), and the like. These data providers can include associated data foundations, semantic layers, management systems, security systems and so on.

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The semantic layer may include logic associated with the underlying data allowing it to automatically formulate queries for execution against the underlying data sources. The logic includes connection to, structure for, and aspects of the data sources. Some semantic layers can be published, so that it can be shared by many clients and users. Some semantic layers implement security at a granularity corresponding to the underlying data sources' structure or at the semantic layer. The specific forms of semantic layers includes data model objects that describe the underlying data source and define dimensions, attributes and measures with the underlying data. The objects can represent relationships between dimension members, and can provide calculations associated with the underlying data.

It is appreciated that the disclosure is not limited to the described embodiments, and that any number of scenarios and embodiments in which conflicting appointments exist may be resolved.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

For simplicity of exposition, the term 'database' was employed in aspects of the above discussion. It will be readily apparent to one of ordinary skill in the art that in the context of the above discussion the scope of that term is not limited just to for example a database management system but rather encompasses inter alia any data source, data model, etc.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

We claim:

1. A mobile device, comprising:
   a processing device including:
   an authenticator that stores at least one profile associated with at least one authenticator key to access at least one server, wherein the at least one server contains at least one register key that is associated with the at least one authenticator key; and
   a processor to embed the at least one authenticator key in data to be communicated to the at least one server to request access from the at least one server, wherein the data includes at least one profile specific program to be executed,
   wherein the authenticator compares the at least one profile to a set of parameters based upon at least one of i) a user's identification information, ii) the selected program to be executed, iii) identification information of the one of the servers, and iv) identification information of an authentication register, to determine whether to select the at least one profile, and
   if the authenticator selects one of the profiles, the authenticator generates the at least one authenticator key based on the selected profile, wherein the authenticator transmits the at least one authenticator key to the processor, wherein the processor embeds the at least one authenticator key in data to be communicated and communicates the at least one authenticator key to the at least one server, and
   wherein if the authenticator determines none of the profiles match the set of parameters, the authenticator selects a default one of the profile to generate the one of the keys and if the one of the keys based upon the default one of the profiles fails to authenticate, the mobile device prompts the user to select another one of the profiles to generate a new key;
   wherein the at least one server compares the at least one authenticator key to the at least one register key, and based on the comparison, the processor executes the at least one program.

2. The mobile device of claim 1, wherein each of the profiles is associated with a secret to be generated based on at least a pseudo-random number.

3. The mobile device of claim 2, wherein each of the keys is generated based upon the secret associated with a corresponding one of the profiles.

4. The mobile device of claim 2, wherein the secret is to be generated based on at least a unique mobile device identification number associated with the mobile device.

5. The mobile device of claim 2, wherein the key is generated based on the secret and at least one of a session ID number and a time stamp associated with requested access.

6. The mobile device of claim 1, wherein if the authenticator determines none of the profiles match the set of parameters, the mobile device prompts the user to register authentication with one of the servers.

7. The mobile device of claim 1, wherein if the authenticator determines none of the profiles match the set of parameters, the mobile device prompts the user to select another one of the profiles to generate the one of the keys.

8. A method of a mobile device, comprising:
   a processing device including:
   storing, by an authenticator, at least one profile associated with at least one authenticator key to access at least one server, wherein the at least one server contains at least one register key that is associated with the at least one authenticator key; and
   embedding, by a processor, the at least one authenticator key in data to be communicated to the at least one server to request access from the at least one server, wherein the data includes at least one profile specific program to be executed,
   wherein the authenticator compares the at least one profile to a set of parameters based upon at least one of i) a user's identification information, ii) the selected program to be executed, iii) identification information of the one of the servers, and iv) identification information of an authentication register, to determine whether to select at least one the profile, and
   if the authenticator selects one of the profiles, the authenticator generates the at least one authenticator key based on the selected profile, wherein the authenticator transmits the at least one authenticator key to the processor, wherein the processor embeds in data to be communicated the at least one authenticator key and communicates the at least one authenticator key to the at least one server,
   wherein if the authenticator determines none of the profiles match the set of parameters, the authenticator selects a default one of the profile to generate the one of the keys and if the one of the keys based upon the default one of the profiles fails to authenticate, the mobile device prompts the user to select another one of the profiles to generate a new key; and
   wherein the at least one server compares the at least one authenticator key to the at least one register key, and based on the comparison, the processor executes the at least one program.

9. The method of claim 8, wherein each of the profiles is associated with a secret to be generated based on at least a pseudo-random number.

10. The method of claim 9, wherein each of the keys is generated based upon the secret associated with a corresponding one of the profiles.

11. The method of claim 9, wherein the secret is to be generated based on at least a unique mobile device identification number associated with the mobile device.

12. The method of claim 9, wherein the key is generated based on the secret and at least one of a session ID number and a time stamp associated with requested access.

13. The method of claim 8, wherein if the authenticator determines none of the profiles match the set of parameters, the mobile device prompts the user to register authentication with one of the servers.

14. The method of claim 8, wherein if the authenticator determines none of the profiles match the set of parameters, the mobile device prompts the user to select another one of the profiles to generate the one of the keys.

15. A mobile device, comprising:
a processing device including:
an authenticator that stores at least one profile associated with at least one authenticator key to access at least one server, wherein the at least one server contains at least one register key that is associated with the at least one authenticator key; and
a processor to embed the at least one authenticator key in data to be communicated to the at least one server to request access from the at least one server, wherein the data includes at least one profile specific program to be executed,
wherein the authenticator compares the at least one profile to a set of parameters based upon at least one of i) a user's identification information, ii) the selected program to be executed, iii) identification information of the one of the servers, and iv) identification information of an authentication register, to determine whether to select the at least one profile, and
if the authenticator selects one of the profiles, the authenticator generates the at least one authenticator key based on the selected profile, wherein the authenticator transmits the at least one authenticator key to the processor, wherein the processor embeds the at least one authenticator key in data to be communicated and communicates the at least one authenticator key to the at least one server, and
wherein if the authenticator determines none of the profiles match the set of parameters, the authenticator selects a default one of the profile to generate the one of the keys and if the one of the keys based upon the default one of the profiles fails to authenticate, the mobile device prompts the user to register authentication with one of the servers;
wherein the at least one server compares the at least one authenticator key to the at least one register key, and based on the comparison, the processor executes the at least one program.

16. The mobile device of claim 15, wherein each of the profiles is associated with a secret to be generated based on at least a pseudo-random number.

17. The mobile device of claim 16, wherein each of the keys is generated based upon the secret associated with a corresponding one of the profiles.

18. The mobile device of claim 16, wherein the secret is to be generated based on at least a unique mobile device identification number associated with the mobile device.

19. The mobile device of claim 16, wherein the key is generated based on the secret and at least one of a session ID number and a time stamp associated with requested access.

20. The mobile device of claim 15, wherein if the authenticator determines none of the profiles match the set of parameters, the mobile device prompts the user to register authentication with one of the servers.

21. The mobile device of claim 15, wherein if the authenticator determines none of the profiles match the set of parameters, the mobile device prompts the user to select another one of the profiles to generate the one of the keys.

22. A method of a mobile device, comprising:
a processing device including:
storing, by an authenticator, at least one profile associated with at least one authenticator key to access at least one server, wherein the at least one server contains at least one register key that is associated with the at least one authenticator key; and
embedding, by a processor, the at least one authenticator key in data to be communicated to the at least one server to request access from the at least one server, wherein the data includes at least one profile specific program to be executed,
wherein the authenticator compares the at least one profile to a set of parameters based upon at least one of i) a user's identification information, ii) the selected program to be executed, iii) identification information of the one of the servers, and iv) identification information of an authentication register, to determine whether to select at least one the profile, and
if the authenticator selects one of the profiles, the authenticator generates the at least one authenticator key based on the selected profile, wherein the authenticator transmits the at least one authenticator key to the processor, wherein the processor embeds in data to be communicated the at least one authenticator key and communicates the at least one authenticator key to the at least one server,
wherein if the authenticator determines none of the profiles match the set of parameters, the authenticator selects a default one of the profile to generate the one of the keys and if the one of the keys based upon the default one of the profiles fails to authenticate, the mobile device prompts the user to register authentication with one of the servers; and
wherein the at least one server compares the at least one authenticator key to the at least one register key, and based on the comparison, the processor executes the at least one program.

23. The method of claim 22, wherein each of the profiles is associated with a secret to be generated based on at least a pseudo-random number.

24. The method of claim 23, wherein each of the keys is generated based upon the secret associated with a corresponding one of the profiles.

25. The method of claim 23, wherein the secret is to be generated based on at least a unique mobile device identification number associated with the mobile device.

26. The method of claim 23, wherein the key is generated based on the secret and at least one of a session ID number and a time stamp associated with requested access.

27. The method of claim 22, wherein if the authenticator determines none of the profiles match the set of parameters, the mobile device prompts the user to register authentication with one of the servers.

28. The method of claim 22, wherein if the authenticator determines none of the profiles match the set of parameters, the mobile device prompts the user to select another one of the profiles to generate the one of the keys.

\* \* \* \* \*